US 6,767,966 B2

United States Patent
Berger et al.

(10) Patent No.: US 6,767,966 B2
(45) Date of Patent: Jul. 27, 2004

(54) POLYMER MIXTURE CONTAINING AN AMORPHOUS POLYOLEFIN WHICH CONTAIN CYCLOALIPHATIC OLEFINS

(75) Inventors: Klaus Berger, Sulzbach (DE); Wolfram Goerlitz, Wiesbaden (DE); Wilfried Hatke, Kelkheim (DE)

(73) Assignee: Ticona GmbH (DE)

( * ) Notice: Subject to any disclaimer, the term of this patent is extended or adjusted under 35 U.S.C. 154(b) by 85 days.

(21) Appl. No.: 10/220,377

(22) PCT Filed: Feb. 22, 2001

(86) PCT No.: PCT/EP01/02012
§ 371 (c)(1),
(2), (4) Date: Oct. 31, 2002

(87) PCT Pub. No.: WO01/64786
PCT Pub. Date: Sep. 7, 2001

(65) Prior Publication Data
US 2003/0166781 A1 Sep. 4, 2003

(30) Foreign Application Priority Data
Mar. 1, 2000 (DE) .......................... 100 09 646

(51) Int. Cl.$^7$ ........................... C08L 25/02; C08L 45/00
(52) U.S. Cl. ...................................... 525/216; 525/241
(58) Field of Search ................................. 525/216, 241

(56) References Cited

U.S. PATENT DOCUMENTS

| | | | | |
|---|---|---|---|---|
| 5,008,356 A | | 4/1991 | Ishimru et al. | 526/281 |
| 5,087,677 A | | 2/1992 | Brekner et al. | 526/160 |
| 5,324,801 A | | 6/1994 | Brekner et al. | 526/160 |
| 5,371,158 A | | 12/1994 | Brekner et al. | 526/127 |
| 5,589,126 A | | 12/1996 | Shih et al. | 264/211 |
| 5,610,253 A | * | 3/1997 | Hatke et al. | 526/281 |
| 5,623,039 A | * | 4/1997 | Hatke et al. | 526/281 |
| 5,824,398 A | | 10/1998 | Shih | 428/211 |
| 6,027,677 A | | 2/2000 | Ostapchenko et al. | 264/210.1 |
| 6,225,407 B1 | * | 5/2001 | Jacobs et al. | 525/70 |
| 6,489,033 B1 | * | 12/2002 | Hatke et al. | 428/461 |

FOREIGN PATENT DOCUMENTS

| | | |
|---|---|---|
| DE | 109224 | 10/1974 |
| DE | 237070 | 7/1986 |
| DE | 19633641 | 2/1998 |
| EP | 0 317 262 | 1/1996 |
| EP | 0 156 464 | 5/1996 |
| EP | 0 407 870 | 12/1997 |
| EP | 0 816 068 | 1/1998 |
| EP | 0 485 893 | 4/1998 |
| EP | 0 503 422 | 6/1998 |
| EP | 0 744 285 | 12/1999 |
| EP | 0 964 005 | 12/1999 |
| JP | 03106962 | 5/1991 |
| JP | 05051512 | 3/1993 |
| WO | WO 96/37528 | 11/1996 |

* cited by examiner

Primary Examiner—Nathan M. Nutter
(74) Attorney, Agent, or Firm—Connolly Bove Lodge & Hutz LLP

(57) ABSTRACT

The present invention describes a novel transparent polymer mixture with modified relaxation behavior and modified shrinkage behavior, comprising cycloolefin polymers. The polymer mixture comprises at least one amorphous polyolefin. The polymer mixture is used to produce mono- or biaxially oriented films, blister packs, or mixtures with other plastics, particularly with polyolefins. The polymer mixture is used in injection molding, injection blow molding or blow extrusion.

7 Claims, 2 Drawing Sheets

POLYMER MIXTURE CONTAINING AN AMORPHOUS POLYOLEFIN WHICH CONTAIN CYCLOALIPHATIC OLEFINS

The present invention relates to a novel transparent polymer mixture with modified relaxation behavior and modified shrinkage behavior, comprising cycloolefin polymers.

The relaxation behavior of polymers is a description of change in modulus of elasticity as a function of temperature and frequency. The relaxation behavior of a cycloolefin polymer or of a known cycloolefin mixture exhibits a steep fall-off in modulus of elasticity within a narrow temperature range, what is known as the glass transition range or softening range.

Shrinkage behavior is a description of the change in length of mono- or biaxially oriented test specimens as a function of temperature or time.

Delfolie et al., Macromolecules 32, 1999, 7781–7789, studies the miscibility of ethylene-norbornene copolymers. DSC is used to indicate the limits of miscibility: the occurrence of a single glass transition temperature is regarded as a measure of miscibility, while immiscibility is apparent in the occurrence of two separate glass transitions.

Utracki, Polymer Alloys and Blends—Thermodynamics and Rheology, $2^{nd}$ edition, Munich, Hanser 1989, 3 et seq., gives a general description of modulus of elasticity as a function of temperature for 50/50 polymer mixtures in the vicinity of the glass transition temperature. For homogeneously miscible polymers, a steep fall-off in the modulus is found at a central glass transition temperature. For immiscible polymers, two steps in the modulus of elasticity, and therefore two glass transition temperatures, are observed, corresponding to those of the starting materials. For partially miscible polymers, two steps in the modulus of elasticity, and therefore two glass transition temperatures, are observed, and are slightly different from those of the starting materials. For immiscible polymers with fine dispersion below 15 nm, referred to as compatible polymers, a broad glass transition temperature range is found, with a slight fall-off in the modulus of elasticity.

Hsiue and Ye, J. Appl. Pol. Sci. 37, 1989, 2803–2836, describe the shrinkage behavior of oriented polyester films above the glass transition temperature. It is shown that shrinkage behavior of amorphous polymers in this range is determined by the degree of intertwining of the polymer chains. An increase in the molecular weight and a lowering of the orientation temperature lead to greater shrinkage.

U.S. Pat. No. 5,824,398 and U.S. Pat. No. 5,589,126 indicate that addition of a plasticizer to polyester shifts the temperature of shrinkage onset in oriented films to lower temperatures.

A substantial disadvantage of the steep fall-off in the modulus of elasticity with temperature is that there is only a narrow possible temperature range for the elongation of test specimens. This is relevant, for example, in the case of mono- or bi-axial orientation of films. The steep fall-off in modulus of elasticity as a function of temperature also brings about rapid change in the shrinkage of oriented films with temperature. As a result, the films produced give unsatisfactory results when shrunk onto irregularly shaped test specimens. The marked change in length of oriented test specimens with temperature acts together with a high degree of intertwining of the polymer chains to exert a strong shrinkage force on the test specimen, and if wall thickness is low this can lead to undesired volume change. There has therefore been a longstanding desire to find a way of influencing the temperature-dependency of modulus of elasticity in the glass transition region, and of shrinkage, while at the same time retaining transparency.

The object of the present invention is to provide a novel transparent polymer mixture, comprising cycloolefin polymers, with modified relaxation behavior and modified shrinkage behavior.

The object of the present invention is achieved by way of a polymer mixture comprising at least one amorphous polyolefin. Surprisingly, addition of an amorphous polyolefin brings about an unexpected change in the modulus of elasticity and in the shrinkage behavior in relation to temperature.

The mixture of the invention preferably comprises at least one cycloolefin polymer. Addition of at least one amorphous polyolefin to the cycloolefin polymer brings about good results in terms of change in modulus of elasticity and in shrinkage behavior in relation to temperature.

The mixture of the invention preferably comprises at least one amorphous cycloolefin polymer. Addition of at least one amorphous cycloolefin polymer to a cycloolefin polymer brings about particularly good results in terms of change in modulus of elasticity and in shrinkage behavior in relation to temperature.

The mixture of the invention comprises at least one cycloolefin polymer, containing from 0.1 to 100% by weight, preferably from 0.1 to 99.9% by weight, based on the total weight of the cycloolefin copolymer, of polymerized units which derive from at least one polycyclic olefin of the formulae I, II, II', III, IV, V or VI

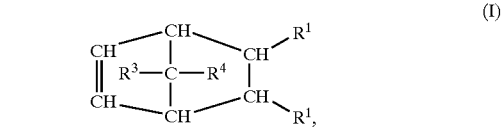

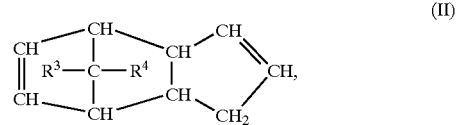

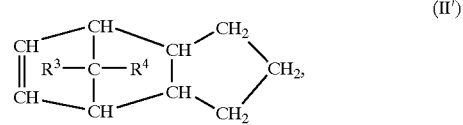

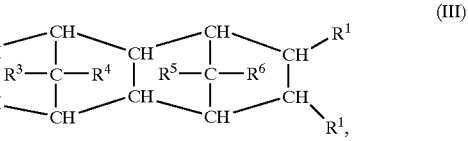

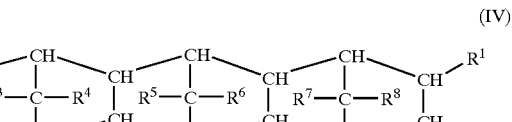

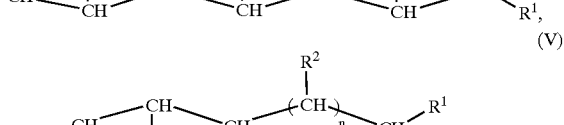

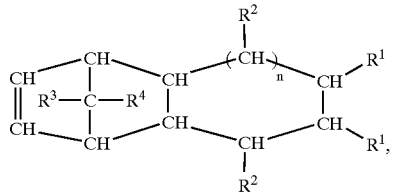

-continued

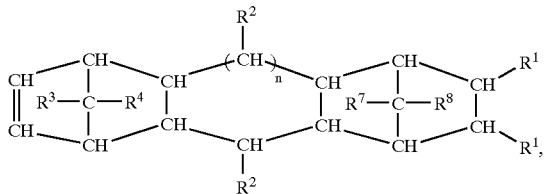
(VI)

where $R^1$, $R^2$, $R^3$, $R^4$, $R^5$, $R^6$, $R^7$, and $R^8$ are identical or different and are a hydrogen atom or a $C_1$–$C_{20}$-hydrocarbon radical, such as a linear or branched $C_1$–$C_8$-alkyl radical, $C_6$–$C_{18}$-aryl radical, $C_7$–$C_{20}$-alkylene-aryl radical, or a cyclic or acyclic $C_2$–$C_{20}$-alkenyl radical, or form a saturated, unsaturated, or aromatic ring, where the same radicals $R^1$ to $R^8$ in the various formulae I to VI may have a different meaning, and where n can assume values from 0 to 5, and containing from 0 to 99.9% by weight, preferably from 0.1 to 99.9% by weight, based on the total weight of the cycloolefin copolymer, of polymerized units which derive from one or more acyclic olefins of the formula VII

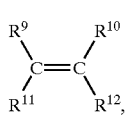
(VII)

where $R^9$, $R^{10}$, $R^{11}$, and $R^{12}$ are identical or different and are a hydrogen atom, or a linear or branched, saturated or unsaturated $C_1$–$C_{20}$-hydrocarbon, radical, such as a $C_1$–$C_8$-alkyl radical or a $C_6$–$C_{18}$-aryl radical.

The cycloolefin copolymers used according to the invention may moreover contain from 0 to 45% by weight, based on the total weight of the cycloolefin copolymer, of polymerized units which derive from one or more monocyclic olefins of the formula VIII

(VIII)

where m is a number from 2 to 10.

The cyclic olefins likewise include derivatives of these cyclic olefins having polar groups, such as halogen groups, hydroxy groups, ester groups, alkoxy groups, carboxy groups, cyano groups, amido groups, imino groups, or silyl groups.

For the purposes of the invention, preference is given to cycloolefin copolymers which contain polymerized units which derive from polycyclic olefins of the formulae I or III, and contain polymerized units which derive from acyclic olefins of the formula VII.

Particular preference is given to cycloolefin copolymers which contain polymerized units which derive from olefins with underlying norbornene structure, very particularly preferably from norbornene and tetracyclo-dodecene, and, where appropriate, vinylnorbornene or norbornadiene.

Particular preference is also given to cycloolefin copolymers which contain polymerized units which derive from acyclic olefins having terminal double bonds, such as α-olefins having from 2 to 20 carbon atoms, very particularly preferably ethylene or propylene. Very great preference is given to norbornene-ethylene copolymers and tetracyclododecene-ethylene copolymers.

Among the terpolymers, particular preference is given to norbornene-vinyl-norbornene-ethylene terpolymers, norbornene-norbornadiene-ethylene terpolymers, tetracyclododecene-vinyinorbornene-ethylene terpolymers, tetracyclododecene-vinyltetracyclododecene-ethylene terpolymers, and norbornene-dicyclopentadiene-ethylene terpolymers. The proportion of the polymerized units which derive from a polyene, preferably vinylnorbornene or norbornadiene, is from 0.1 to 50 mol %, preferably from 0.1 to 20 mol %, and the proportion of the acyclic monoolefin of the formula VII is from 0 to 99.9 mol %, preferably from 5 to 80 mol %, based on the total makeup of the cycloolefin polymer. In the terpolymers described, the proportion of the polycyclic monoolefin is from 0.1 to 99.9 mol %, preferably from 3 to 75 mol %, based on the total makeup of the cycloolefin polymer.

EP-A-317262 describes other suitable polymers. Hydrogenated polymers and copolymers, such as those of styrene or dicyclopentadiene and of other amorphous polyolefins, are expressly also suitable.

Blends of these polymers with typical plastics additives, such as antioxidants, metal deactivators, light stabilizers, plasticizers, lubricants, processing aids, antistats, optical brighteners, biostabilizers, flame retardants, pigments, dyes, and also fillers and reinforcing agents (see also Gächter, Müller, Plastics Additive Handbook, 4$^{th}$ edition, 1993, Munich, Hanser) are expressly also suitable.

The cycloolefin copolymers used according to the invention may be prepared at temperatures of from −78 to 200° C. and at a pressure of from 0.01 to 200 bar in the presence of one or more catalyst systems which comprise at least one transition metal compound and, where appropriate, comprise a cocatalyst and, where appropriate, a support material. Suitable transition metal compounds are metallocenes, in particular stereorigid metallocenes. Examples of catalyst systems which are suitable for producing the cycloolefin copolymers of the invention are described in U.S. Pat. No. 5,008,356, EP-A-0 407 870, EP-A-0 485 893, and EP-A-0 503 422. These references are expressly incorporated herein by way of reference. The disclosure of these references is therefore a constituent of the present patent application.

Examples of transition metal compounds used are:
rac-dimethylsilylbis(1-indenyl)zirconium dichloride,
rac-dimethylgermylbis(1-indenyl)zirconium dichloride,
rac-phenylmethylsilylbis(1-indenyl)zirconium dichloride,
rac-phenylvinylsilylbis(1-indenyl)zirconium dichloride,
1-silacyclobutylbis(1-indenyl)zirconium dichloride,
rac-diphenylsilylbis(1-indenyl)hafnium dichloride,
rac-phenylmethylsilylbis(1-indenyl)hafnium dichloride,
rac-diphenylsilylbis(1-indenyl)zirconium dichloride,
rac-ethylene-1,2-bis(1-indenyl)zirconium dichloride,
dimethylsilyl-(9-fluorenyl)(cyclopentadienyl)zirconium dichloride,
diphenylsilyl-(9-fluorenyl)(cyclopentadienyl)zirconium dichloride,
bis(1-indenyl)zirconium dichloride,
diphenylmethylene-(9-fluorenyl)cyclopentadienylzirconium dichloride,
isopropylene-(9-fluorenyl)cyclopentadienylzirconium dichloride,
rac-isopropylidenebis(1-indenyl)zirconium dichloride,
phenylmethylmethylene-(9-fluorenyl)cyclopentadienylzirconium dichloride,
isopropylene-(9-fluorenyl)(1-(3-isopropyl)cyclopentadienyl)zirconium dichloride,
isopropylene-(9-fluorenyl)(1-(3-methyl)cyclopentadienyl)zirconium dichloride, diphenylmethylene-(9-fluorenyl)(1-(3-methyl)cyclopentadienyl)zirconium dichloride,
methylphenylmethylene-(9-fluorenyl)(1-(3-methyl)cyclopentadienyl)-zirconium dichloride,
dimethylsilyl-(9-fluorenyl)(1-(3-methyl)cyclopentadienyl)zirconium dichloride,
diphenylsilyl-(9-fluorenyl)(1-(3-methyl)cyclopentadienyl)zirconium dichloride,
diphenylmethylene-(9-fluorenyl)(1-(3-tert-butyl)cyclopentadienyl)zirconium dichloride,
isopropylene-(9-fluorenyl)(1-(3-tert-butyl)cyclopentadienyl)zirconium dichloride,
isopropylene(cyclopentadienyl)(1-indenyl)zirconium dichloride,
diphenylcarbonyl(cyclopentadienyl)(1-indenyl)zirconium dichloride,
dimethylsilyl(cyclopentadienyl)(1-indenyl)zirconium dichloride,
isopropylene(methylcyclopentadienyl)(1-indenyl)zirconium dichloride,
[4-($\eta^5$-cyclopentadienyl)-4,7,7-trimethyl($\eta^5$-4,5,6,7-tetrahydroindenyl)]zirconium dichloride,
[4-($\eta^5$-cyclopentadienyl)-4,7,7-triphenyl($\eta^5$-4,5,6,7-tetrahydroindenyl)]zirconium dichloride,
[4-($\eta^5$-cyclopentadienyl)-4,7-dimethyl-7-phenyl($\eta^5$-4,5,6,7-tetrahydroindenyl)]zirconium dichloride,
[4-($\eta^5$-5-3'-tert-butylcyclopentadienyl)-4,7,7-triphenyl($\eta^5$-4,5,6,7-tetrahydroindenyl)]zirconium dichloride,
[4-($\eta^5$-3'-tert-butylcyclopentadienyl)-4,7-dimethyl-7-phenyl($\eta^5$-4,5,6,7-tetrahydroindenyl)]zirconium dichloride,
[4-($\eta^5$-3'-methylcyclopentadienyl)-4,7,7-trimethyl($\eta^5$-4,5,6,7-tetrahydroindenyl)]zirconium dichloride,
[4-($\eta^-$3'-methylcyclopentadienyl)-4,7,7-triphenyl($\eta^5$-4,5,6,7-tetrahydroindenyl)]zirconium dichloride,
[4-($\eta^5$-3'-methylcyclopentadienyl)-4,7-dimethyl-7-phenyl($\eta^5$-4,5,6,7-tetrahydroindenyl)]zirconium dichloride,
[4-($\eta^5$-3'-isopropylcyclopentadienyl)-4,7,7-trimethyl($\eta^5$-4,5,6,7-tetrahydroindenyl)]zirconium dichloride,
[4-($\eta^5$-3'-isopropylcyclopentadienyl)-4,7,7-triphenyl($\eta^5$-4,5,6,7-tetrahydroindenyl)]zirconium dichloride,
[4-($\eta^3$-isopropylcyclopentadienyl)-4,7-dimethyl-7-phenyl($\eta^5$-4,5,6,7-tetrahydroindenyl)]zirconium dichloride,
[4-($\eta^5$-cyclopentadienyl)($\eta^5$-4,5-tetrahydropentalene)]zirconium dichloride,
[4-($\eta^5$-cyclopentadienyl)-4-methyl($\eta^5$-4,5-tetrahydropentalene)]zirconium dichloride,
[4-($\eta^5$-cyclopentadienyl)-4-phenyl($\eta^5$-4,5-tetrahydropentalene)]zirconium dichloride,
[4-($\eta^5$-cyclopentadienyl)-4-phenyl($\eta^5$-4,5-tetrahydropentalene)]zirconium dichloride,
[4-($\eta^5$-3'-methylcyclopentadienyl)($\eta^5$-4,5-tetrahydropentalene)]zirconium dichloride,
[4-($\eta^5$-3'-isopropylcyclopentadienyl)($\eta^5$-4,5-tetrahydropentalene)]zirconium dichloride,
[4-($\eta^5$-3'-benzylcyclopentadienyl)($\eta^5$-4,5-tetrahydropentalene)]zirconium dichloride,
[2,2,4-trimethyl-4-($\eta^5$-cyclopentadienyl)($\eta^5$-4,5-tetrahydropentalene)]zirconium dichloride, [2,2,4-trimethyl-4-( -(3,4-diisopropyl)cyclopentadienyl)($\eta^5$-4,5-tetrahydropentalene)]zirconium dichloride.

The cycloolefin copolymers can also be prepared by other routes briefly outlined below: catalyst systems based on mixed catalysts made from titanium salts and from aluminum organyl compounds are described in DD-A-109 224 and DD-A-237 070. EP-A-0 156464 describes the preparation process using vanadium-based catalysts.

The cycloolefin copolymers may also be prepared by ring-opening polymerization of at least one of the monomers having the formulae I to VI and then hydrogenation of the resultant products.

The polymerization may also take place in two or more stages, and the products may also be block copolymers (DE-A-42 05 416).

Cycloolefin copolymers are preferably amorphous, transparent materials. The heat resistances of cycloolefin copolymers may be adjusted within a wide range. As a guideline for heat resistance, as may be determined on injection moldings to ISO 75 Part 1 and Part 2, the glass transition temperature may be utilized in the case of cycloolefin copolymers, as measured by DIN EN ISO 11357-1 with the aid of DSC. The cycloolefin copolymers described have glass transition temperatures of from −50 to 250° C. Preference is given to glass transition temperatures between 0 and 220° C, particularly glass transition temperatures between 40 and 200° C.

The average molar mass of the cycloolefin copolymers may be varied via hydrogen feed, variation in catalyst concentration, or variation in temperature, in a known manner. The cycloolefin copolymers have weight-average molar masses Mw of from 1 000 to 10 000 000 g/mol. Preference is given to weight-average molar masses Mw of from 5 000 to 5 000 000 g/mol, particularly to weight-average molar masses Mw of from 5 000 to 1 200 000 g/mol. These molar masses determined with the aid of gel permeation chromatography (GPC) in chloroform at 35° C. with the aid of an RI detector are relative molar masses based on calibration using narrowly distributed polystyrene standards.

The cycloolefin copolymers described here have viscosity numbers to DIN 53 728 of from 5 to 5 000 ml/g. Preference is given to viscosity numbers of from 5 to 2 000 ml/g, particularly to viscosity numbers of from 5 to 1 000 ml/g.

The optical properties of the polymer mixtures were assessed visually qualitatively on pressed plaques of thickness 1 mm.

The transparent polymer mixture of the invention, comprising cycloolefin polymers and having modified relaxation behavior and modified shrinkage behavior, may particularly be used for the following products. Mono- or biaxially oriented films with modified shrinkage behavior. Products in which heat resistance has been changed from that of the starting materials by using blends of the invention. Blister packs in which thermoformability has been modified by using the blends of the invention. Mixtures with other plastics, particularly polyolefins in which relaxation behavior, shrinkage behavior, or heat resistance has been modified by using the blends of the invention. Mono- or biaxially oriented films for which wide processing latitude for orientation is rendered possible by using the blends of the invention. Test specimens produced by injection blow molding, such as small bottles, for which wide processing latitude for blowing is rendered possible by using the blends of the invention. Films produced by extrusion and blowing, for which wide processing latitude is rendered possible by using the blends of the invention.

Further clarification of the invention will now be given, using examples and diagrams.

EXAMPLE 1

500 g of norbornene-ethylene copolymer pellets with a glass transition temperature of 69° C., VN of 90 ml/g and Mw=120 000 g/mol (tradename Topas® 8006, Ticona GmbH, Frankfurt) were homogenized with 500 g of norbornene-ethylene copolymer pellets with a glass transition temperature of 145° C., VN of 65 ml/g and Mw=70 000 g/mol (tradename Topas® 6013, Ticona GmbH, Frankfurt), on a set of rolls. The homogenized mixture was cast to an injection molding machine and test specimens were produced at 250° C. melt temperature. The test specimens were transparent.

Glass transition temperatures measured to DIN EN ISO 11357-1 were determined on the test specimens with the aid of DSC (TAInst 2920) with heating rate 20 K/min, using the second heating curve. The glass transition temperature (Tg) was 87° C., and the temperature difference between the start and center point (Tg width) was 8.3° C.

Modulus of elasticity and tan delta were determined as a function of temperature, using a torsion pendulum at frequency 5 Hz and heating rate 5° C./min, using test specimens of dimensions 50*10*1 mm. The maximum of tan delta (tan d max) was found at 97° C.

A press was used to produce films of thickness 1 mm from the test specimens. From these, specimens of 20×20 mm were cut. These films were elongated to five times their length using an (Instron) tensile strain tester, the strain velocity being 500 mm/min at 125° C., and were cooled under tension. The change in length of these oriented films was then determined as a function of temperature. For temperatures under 90° C., the oriented films were stored for 30 s in a waterbath, and above 90° C. they were stored for 180 s in a circulating-air drying cabinet, on sand. The shrinkage is the change in length prior to and after storage at high temperature, divided by initial length.

Examples 1 and 2 show the desired modified relaxation behavior and modified shrinkage behavior with retention of transparency.

Comparative example 1 shows the known relaxation behavior and shrinkage behavior of amorphous polyolefins.

Comparative example 2 is a cloudy product which has two separate glass transition temperatures. This means that the two substances are not homogeneously miscible. No orientation was possible at any temperature.

Comparative example 3 is an opaque polymer mixture which shows the known relaxation behavior and shrinkage behavior of amorphous polyolefins.

Comparative example 4 is a transparent mixture of amorphous polyolefins which shows the known relaxation behavior and shrinkage behavior of amorphous polyolefins.

In order to shift the glass transition temperature, and therefore the fall-off in modulus of elasticity and the onset of shrinkage, to lower temperatures, it is moreover possible to add plasticizers, such as phthalates, phosphates, adipates, azelates, sebacates, fatty esters, epoxidized fatty esters, citrates, low-molecular-weight polyesters, and chlorinated hydrocarbons. Compounds which are expressly particularly suitable are high-boiling medicinal white oils, such as Ondina 9xx (Deutsche Shell), Cobersol (Cöner Benzin Rafinerie), and Enerpar (BP lubricants), which have little intrinsic color and give transparent, colorless mixtures with amorphous polyolefins.

The table below gives further examples and comparative examples:

|  | Ex. 2 | Comp. Ex. 1 | Comp. Ex. 2 | Comp. Ex. 3 | Comp. Ex. 4 |
|---|---|---|---|---|---|
| Component 1 | 8006 | 8006 | 8006 | 8006 | 8006 |
| Proportion, % | 75 | 100 | 50 | 75 | 75 |
| Component 2 | 6013 | — | Zeonor 1060 | Kraton G 1560 | Topas TM |
| Proportion, % | 25 | 0 | 50 | 25 | 25 |
| Production | injection molding | injection molding | injection molding | extrusion | extrusion |
| Transparency | transparent | transparent | cloudy | opaque | transparent |
| Tg/° C. | 80 | 69 | 70/102 | 68 | 67 |
| Tg width/° C. | 6.8 | 4.7 | 5.9 | 6.3 | 7.4 |
| Tan d max/° C. | 86 | 73 | 70/102 | 71 | 71 |
| Orient T/° C. | 110 | 90 | not possible | 90 | 90 |

The table below gives further examples and comparative examples:

Zeonor 1060 is an amorphous cycloolefin polymer from Nippon Zeon Co. Ltd. (Japan) with glass transition temperature 106° C.

Kraton G 1650 is a thermoplastic linear S-E/B-S elastomer from Deutsche Shell Chemie GmbH, Eschborn.

Topas TM is a norbornene-ethylene copolymer with glass transition temperature 65° C., VN of 15 ml/g and Mw=10 000 g/mol, from Ticona GmbH, Frankfurt.

The present invention is described in more detail using FIGS. 1 and 2.

Figure 1:
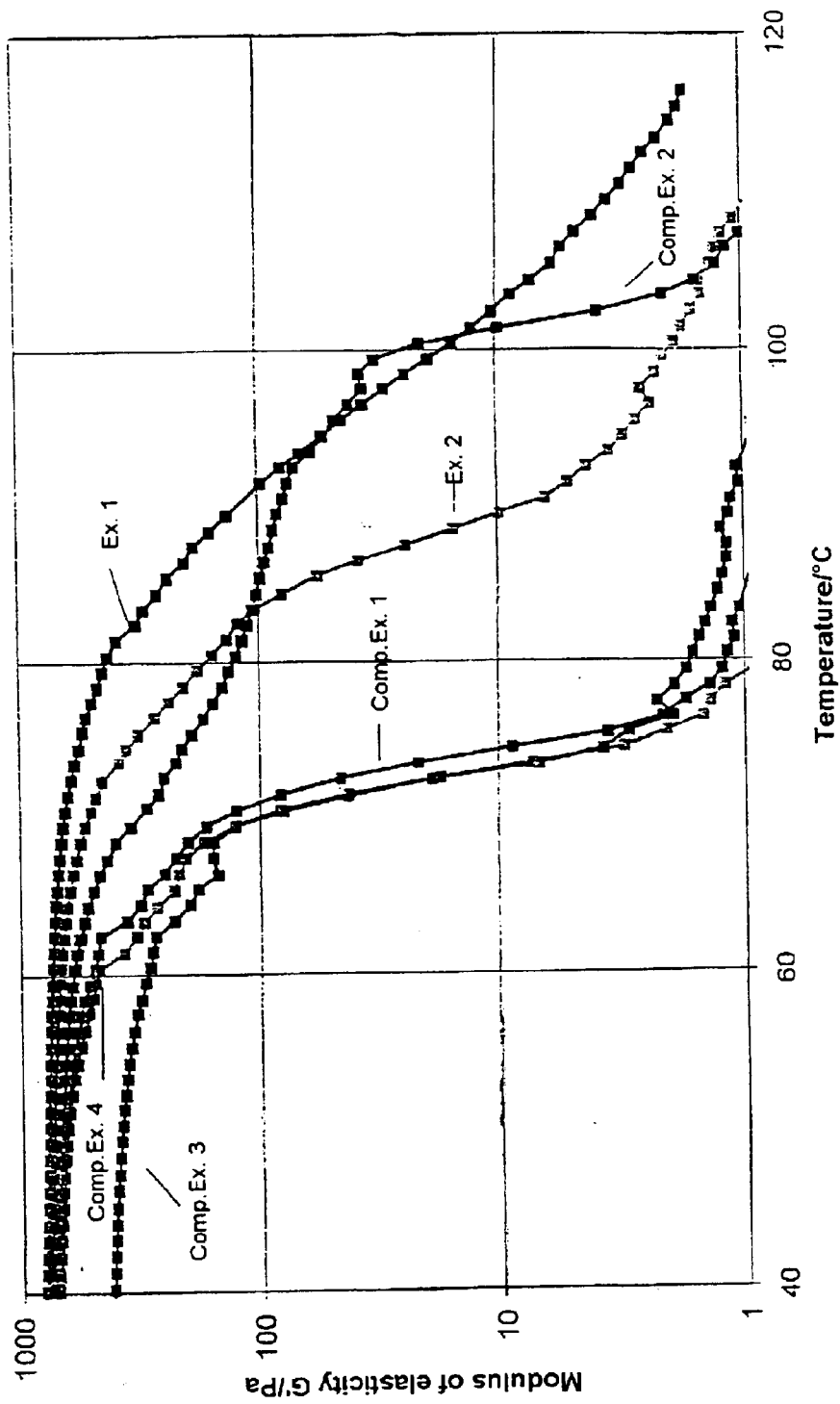
FIG. 1 shows the moduli of elasticity of the examples and comparative examples as a function of temperature.
Figure 2:
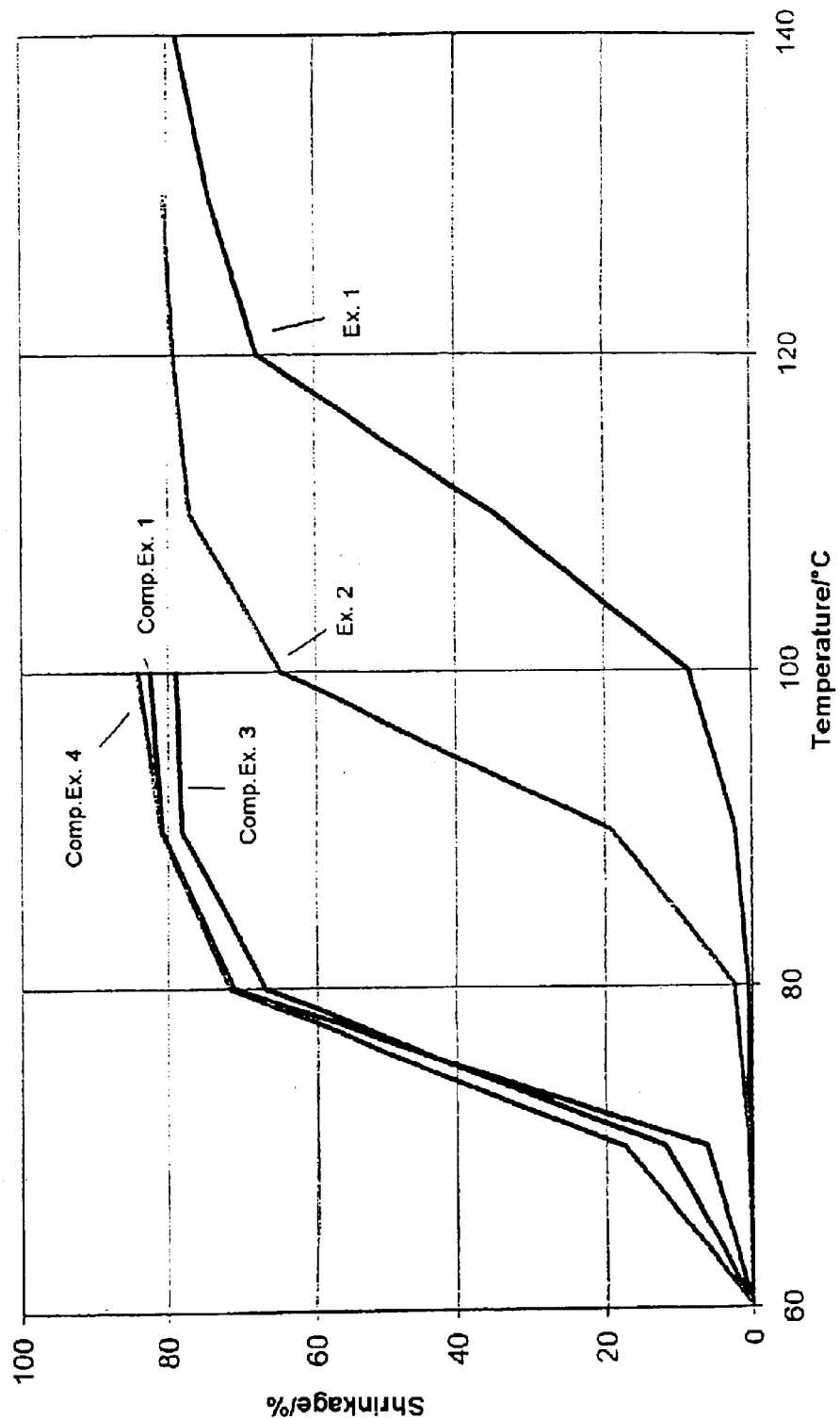
FIG. 2 shows the shrinkage of the examples and comparative examples as a function of temperature.

What is claimed is:

1. A polymer mixture with improved relaxation behavior and improved shrinkage behavior, comprising at least one cycloolefin polymer and at least one amorphous cycloolefin polymer, wherein the cycloolefin polymer contains from 0.1 to 100% by weight, based on the total weight of the cycloolefin polymer, of polymerized units which are made from at least one polycyclic olefin of the formulae I, II, II', III, IV, V or VI

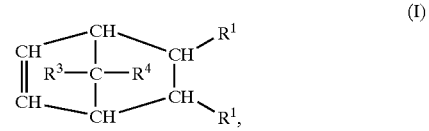

-continued

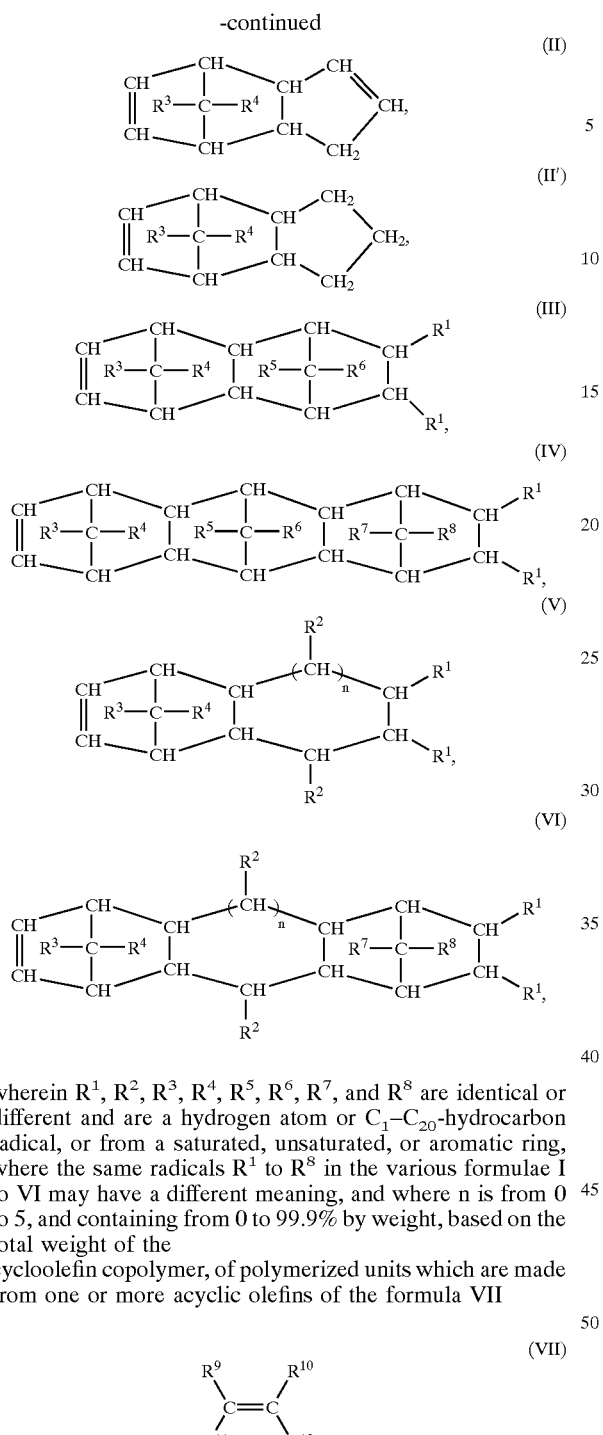

wherein $R^1$, $R^2$, $R^3$, $R^4$, $R^5$, $R^6$, $R^7$, and $R^8$ are identical or different and are a hydrogen atom or $C_1$–$C_{20}$-hydrocarbon radical, or from a saturated, unsaturated, or aromatic ring, where the same radicals $R^1$ to $R^8$ in the various formulae I to VI may have a different meaning, and where n is from 0 to 5, and containing from 0 to 99.9% by weight, based on the total weight of the cycloolefin copolymer, of polymerized units which are made from one or more acyclic olefins of the formula VII (VII)

$$R^9\phantom{xx}R^{10}$$
$$\phantom{xx}C=C$$
$$R^{11}\phantom{xx}R^{12},$$

wherein $R^9$, $R^{10}$, $R^{11}$, and $R^{12}$ are identical or different and are a hydrogen atom, or a linear or branched, saturated or unsaturated $C_1$–$C_{20}$-hydrocarbon radical.

2. The mixture as claimed in claim 1, wherein the cycloolefin polymer contains from 0.1 to 99.9% by weight, based on the total weight of the cycloolefin polymer, of polymerized units which are made from at least one polycyclic olefin of the formulae I, II, II', III, IV, V or VI, wherein $R^1$, $R^2$, $R^3$, $R^4$, $R^5$, $R^6$, $R^7$, and $R^8$ are identical or different and are a hydrogen atom, a linear or branched $C_1$–$C_8$-alkyl radical, $C_6$–$C_{18}$-aryl radical, $C_7$–$C_{20}$-alkylenearyl radical, or a cyclic or acyclic $C_2$–$C_{20}$-alkenyl radical, or form a saturated, unsaturated, or aromatic ring, and containing from 0.1 to 99.9% by weight, based on the total weight of the cycloolefin copolymer, of polymerized units which derive from one or more acyclic olefins of the formula VI.

3. A process for producing polymer mixture with improved relaxation behavior and improved shrinkage behavior which comprises mixing at least one cycloolefin polymer and at least one amorphous cycloolefin polymer, wherein the cycloolefin polymer contains from 0.1 to 100% by weight, based on the total weight of the cycloolefin polymer, of polymerized units which are made from at least one polycyclic olefin of the formula I, II, II', III, IV, V or VI

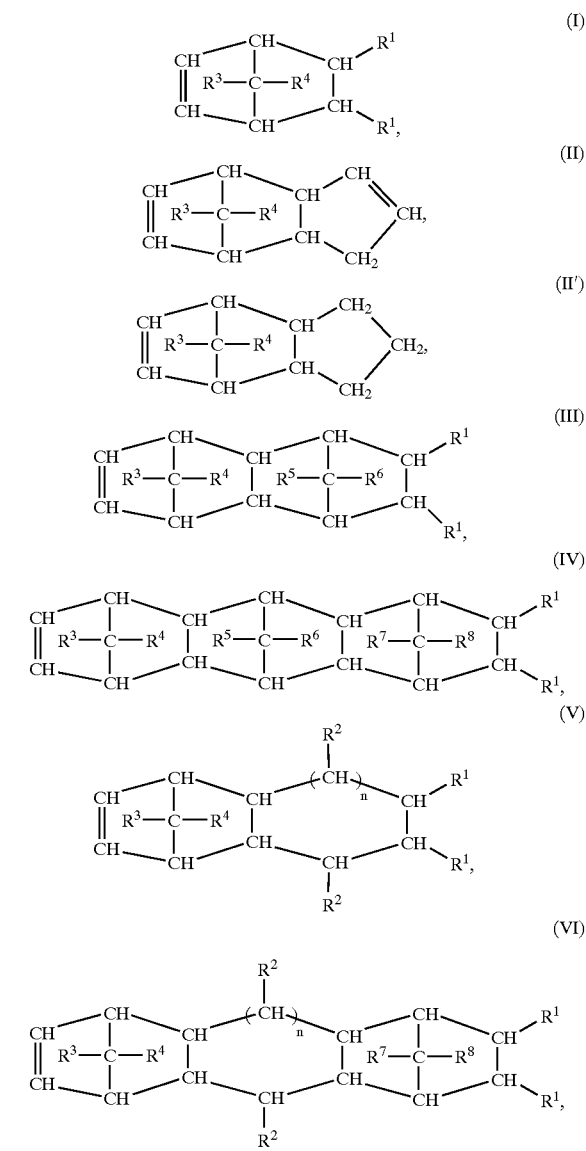

wherein $R^1$, $R^2$, $R^3$, $R^4$, $R^5$, $R^6$, $R^7$, and $R^8$ are identical or different and are a hydrogen atom or a $C_1$–$C_{20}$-hydrocarbon radical, or form a saturated, unsaturated, or aromatic ring, where the same radicals $R^1$ to $R^8$ in the various formula I to VI may have a different meaning, and where n is from 0 to 5, and containing from 0 to 99.9% by weight, based on the total weight of the cycloolefin copolymer, of polymerized units which are made from one or more acyclic olefins of the formula VII

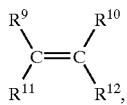 (VII)

wherein $R^9$, $R^{10}$, $R^{11}$, and $R^{12}$ are identical or different and are a hydrogen atom, or a linear or branched, saturated or unsaturated $C_1$–$C_{20}$-hydrocarbon radical.

4. The mixture as claimed in claim 1, wherein said cycloolefin copolymer is norbornadiene or vinylnorbornene.

5. The process as claimed in claim 3, wherein said cycloolefin copolymer is norbornadiene or vinylnorbornene.

6. The mixture as claimed in claim 2, wherein the mixture contains norbornene-ethylene copolymers or tetracyclododecene-ethylene copolymers.

7. The process as claimed in claim 3, wherein the mixture contains norbornene-ethylene copolymers or tetracyclododecene-ethylene copolymers.

* * * * *

UNITED STATES PATENT AND TRADEMARK OFFICE
CERTIFICATE OF CORRECTION

PATENT NO. : 6,767,966 B2 Page 1 of 1
DATED : July 27, 2004
INVENTOR(S) : Klaus Berger et al.

It is certified that error appears in the above-identified patent and that said Letters Patent is hereby corrected as shown below:

Column 9,
Line 43, "from" should read -- form --.

Signed and Sealed this

Twenty-first Day of December, 2004

JON W. DUDAS
*Director of the United States Patent and Trademark Office*